United States Patent [19]

Wert, III

[11] 4,372,653
[45] Feb. 8, 1983

[54] POLARIZING BEAM SPLITTING PHASE TRANSITION OPTICAL MODULATOR

[76] Inventor: John C. Wert, III, 3101 Kemp Rd., Dayton, Ohio 45431

[21] Appl. No.: 968,875

[22] Filed: Dec. 12, 1978

[51] Int. Cl.³ .............................. G02F 1/19; G02B 5/30
[52] U.S. Cl. ..................................... 350/385; 350/395
[58] Field of Search ..................... 350/152, 147, 150

[56] References Cited
U.S. PATENT DOCUMENTS

| | | | |
|---|---|---|---|
| Re. 28,199 | 10/1974 | Deb et al. | 350/357 |
| 3,021,754 | 2/1962 | Ross | 350/150 |
| 3,439,974 | 4/1969 | Henry et al. | 350/150 |
| 3,578,843 | 5/1971 | Castellion | 350/357 |
| 3,971,874 | 7/1976 | Ohta et al. | 350/353 |

Primary Examiner—William H. Punter
Attorney, Agent, or Firm—Donald J. Singer; Thomas L. Kundert

[57] ABSTRACT

A polarizing modulator of luminous energy which relies upon the rapid phase transition characteristics of compounds from the group consisting of VO, $VO_2$, $V_2O_3$, $V_3O_5$, $V_4O_7$, $V_5O_9$, $V_6O_{11}$, $V_7O_{13}$, $V_8O_{15}$, $Ti_2O_3$, $Ti_4O_7$, $NbO_2$, $FeSi_2$, $VO_2NbO_2$, $V_{1-x}Mo_xO_2$, $VO_2$-$TiO_2$, $V_2O_3$-$Ti_2O_3$, $V_{1-x}Ge_xO_2$, $V_{1-x}Nb_xO_2$, $V_{1-x}Cr_xO_2$, $(Cr_xV_{1-x})_2O_3$ and $V_{1-x}Ti_xO_2$ to controllably vary the luminous energy output beam between unpolarized and polarized states. An unpolarized beam is projected onto a substantially flat surface of a crystal or layered thin film structure fabricated with a compound from the above-defined group. The angle of incidence is so oriented as to form Brewster's angle with respect to the beam. When the compound of transitional material is stimulated into its transmissive (non-metallic) state, the reflected portion of the incident luminous energy beam is polarized. In the alternate, when the transitional compound is stimulated into its reflective (metallic) state, all polarizations of the incident beam are reflected. Controlled modulation of the transition material state is effected by stimuli such as electric field, thermal energy or hydrostatic pressure.

2 Claims, 5 Drawing Figures

POLARIZING BEAM SPLITTING PHASE TRANSITION OPTICAL MODULATOR

RIGHTS OF THE GOVERNMENT

The invention described herein may be manufactured and used by or for the Government of the United States for all governmental purposes without the payment of any royalty.

CROSS-REFERENCE TO RELATED APPLICATIONS

This invention relates to copending patent application Ser. No. 401,162 (filed July 23, 1982) to the above named inventor which is a continuation-in-part of Ser. No. 139,070 (filed Apr. 10, 1980), now abandoned, which is a continuation-in-part of Ser. No. 965,464 (filed Nov. 30, 1978), now abandoned.

BRIEF SUMMARY OF THE INVENTION

The invention disclosed herein contemplates a modulator which takes an incident beam of unpolarized luminous energy and transforms it into a train of alternating polarized and unpolarized segments. The incoming beam of unpolarized luminous energy strikes the exterior surface of the modulating device so as to intersect the surface at Brewster's angle. Modulation occurs when the device transitions in phase between a state in which it is transmissive to the incident beam of luminous energy and a second state in which the device is essentially reflective. In either case, phase transition into either state is controlled directly by external stimuli.

The modulator device is fabricated with transitional materials, oxide compounds, from a group consisting of $VO$, $VO_2$, $V_2O_3$, $V_3O_5$, $V_4O_7$, $V_5O_9$, $V_6O_{11}$, $V_7O_{13}$, $V_8O_{15}$, $Ti_2O_3$, $Ti_4O_7$, $NbO_2$, $FeSi_2$, $VO_2NbO_2$, $V_{1-x}Mo_xO_2$, $VO_2$-$TiO_2$, $V_2O_3$-$Ti_2O_3$, $V_{1-x}Ge_xO_2$, $V_{1-x}Nb_xO_2$, $V_{1-x}Nb_xO_2$, $V_{1-x}Cr_xO_2$, $(Cr_xV_{1-x})_2O_3$ and $V_{1-x}Ti_xO_2$. The above defined oxide compounds are generally characterized by their narrow 3d bands and, typically, energy gaps within the range extending from 0.1 eV to 0.4 eV. A further common trait is their periodic table location, wherein the compounds tend to be oxides of elements in either Group VB or IVB.

Structurally, the transitional materials in the modulator device can be in the form of a thin film or single crystal. When a sandwiched thin film configuration is utilized, the non-transitional materials of the sandwich structure should be substantially transparent at the luminous energy wavelength and, preferably, have matching indices of refraction with the transitional material. The exterior of the surface illuminated by the incident beam should also be optically polished.

The device is used by orienting the substantially flat surface of the modulator device, with respect to the unpolarized luminous energy beam, so as to form an angle of incidence equal to Brewster's angle for the outermost material. When the transitional material is stimulated into its transmissive state (i.e. its nonmetallic transparent state) the Brewster angle orientation polarizes the incident beam. Modifying the stimulation to induce the material into its reflective state (i.e. its metallic state) produces a reflection of the total unpolarized luminous energy beam.

Thereby, stimuli including individual or combined applications of hydrostatic pressure, thermal energy or electric field directly modulate the polarization characteristics of the reflected portion of the incident luminous energy beam.

DETAILED DESCRIPTION

Figure 1:
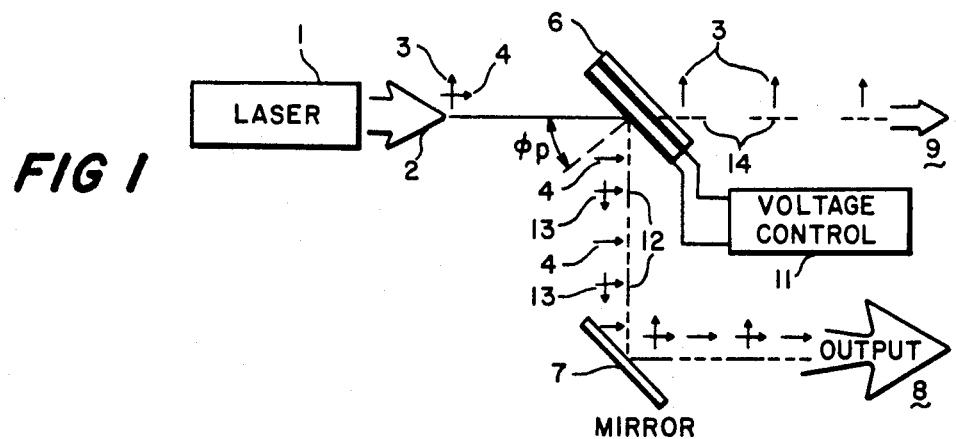
FIG. 1 is a schematic depicting an embodiment of the polarizing modulator.

Referring now to FIG. 1, there appears a schematic embodying a complete polarizing modulator system. Conventional laser 1 generates an unpolarized luminous energy beam 2 and is aligned with modulator device 6 so as to form an incident angle $\phi_p$ at the point beam 2 strikes device 6. For purposes of clarity, polarization vectors 3 and 4 are shown immediately adjacent beam 2 to symbolize the unpolarized character of the beam. The reflected portion of incident luminous energy beam 2, described in further detail hereinafter, is eventually reflected off conventional mirror 7 as an output beam 8. That portion of beam 2 which is refracted, namely that which travels through device 6, leaves the modulating system as train 9 of luminous energy pulses. Also appearing in FIG. 1 is voltage control 11, which for purposes of this embodiment modulates output beam by periodically stimulating modulator device 6 between its reflective and transmissive states.

When modulator device 6 is stimulated into a reflective state, unpolarized incident beam 2 is fully reflected onto the path eventually intersecting mirror 7. The effects on beam 2 during the time when modulator device 6 takes on its reflective state are represented by solid line segments 12 and their associated polarization vectors 13.

On the other hand, during the time period when modulator device 6 is stimulated into its transmissive state by voltage control 11, the luminous energy polarized according to vector 3 travels through device 6, leaving the far side of the device in the form of a polarized luminous energy beam train 9. Dashed lines 14 represent the time presence of a polarized segment of luminous energy beam 2. The remaining polarization of beam 2, vector 4, does not pass through device 6 as does vector 3, but rather, is reflected at the incident surface of modulator device 6 as a result of $\phi_p$ being set at Brewster's angle. Thereafter, polarization vector 4 of beam 2 travels essentially the same path that the fully reflected time segment of beam 2 does.

Figure 2:
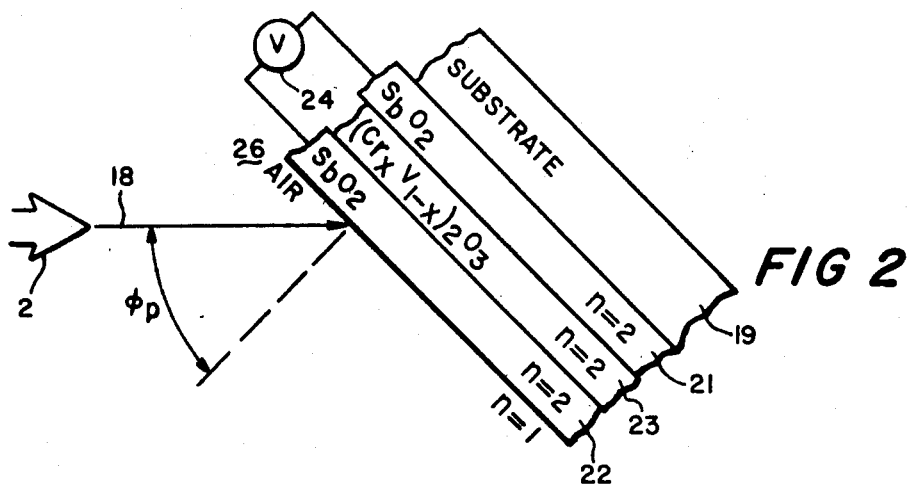
FIG. 2 is a cross-sectional schematic of a sandwiched structure thin film modulator device.

Turning now to the internal structure of modulator device 6, one embodiment of which is shown schematically in FIG. 2. This particular configuration is generally known as a sandwiched structure of thin film layers, beginning with a substantially transparent substrate, 19, as the structural foundation. Upon this substrate are deposited two conductive layers, 21 and 22, having therebetween an intermediate layer 23 of transitional material $(Cr_xV_{1-x})_xO_3$. Layers 21 and 22 are shown to be thin films of $SbO_2$, which material is electrically conductive yet transparent to the luminous energy wavelength of beam 2. Since transitional material layer 23 is sandwiched between SbO$_2$ conductive layers 21 and 22, an electric field may be impressed across layer 23 by electrically attaching a voltage source, such as 24, to layers 21 and 22. The exterior surface of SbO$_2$, the interface between layer 22 and air 26, is optically polished to optimize the magnitude of the polarized vector that is reflected.

As a first case consider the situation where $(Cr_xV_{1-x})_2O_3$ layer 23 is stimulated into its transmissive (non-metallic) state. Luminous energy beam 2 traveling along path 18 strikes outer layer 22 at an angle of incidence $\phi_p$, where $\phi_p$ is Brewster's angle with reference to SbO$_2$ layer 22. Upon striking the polished exterior surface of layer 22 the incident beam is polarized. The reflected polarization vector, symbolized by reference 4 in FIG. 1, never enters modulator device 6, whereas the refracted portion not only enters but passes clear through substantially transparent layers 22, 23, 21 and 19, in that order.

Next, assume voltage source 24 stimulates $(Cr_xV_{1-x})_2O_3$ layer 23 into its reflective (metallic) state. Again, as in the previous case, the incident beam along path 18 undergoes polarization at the polished exterior surface of SbO$_2$ layer 22. The refracted polarization of the incident beam passes through layer 22 but is subsequently reflected upon reaching the reflective surface of layer 23. Once reflected this polarization of the incident beam travels back through layer 22 and into air 26, though it is displaced slightly in time and position from the portion which was reflected directly by the exterior surface of SbO$_2$ layer 22.

For the particular embodiment shown in FIG. 2 layer materials SbO$_2$ and $(Cr_xV_{1-x})_2O_3$ have matching indices of refraction at values of n=2. Layers with matched indices are preferred in that the luminous energy reflected at the various material interfaces is not angularly dispursed, but rather tends to collimate.

Figure 3:
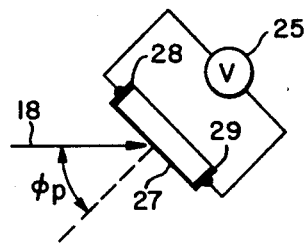
FIG. 3 schematically displays a single crystal modulator device.

An alternate embodiment for modulator device 6 appears schematically in FIG. 3. This variant of the modulating device is in the form of a single crystal of transitional material 27 connected by means of lateral contacts 28 and 29 to source 25 of electrical voltage. As was in the case of the multi-layer structure described with reference to FIG. 2, the incident angle of the luminous energy beam is $\phi_p$, Brewster's angle with reference to material 27. Table I lists three transitional materials, their indices of refraction, and respective Brewster angles.

TABLE I

| TRANSITIONAL MATERIAL | INDEX OF REFRACTION (n) | BREWSTER ANGLE ($\phi_p$) |
|---|---|---|
| VO$_2$ | 2.4, 3.0* | 67.5°, 71:5°* |
| V$_2$O$_3$ | 1.8 | 60.9° |
| $(Cr_xV_{1-x})_2O_3$ | 2.0 | 63.4° |

*Empirical data yielded both values.

The group of materials which have the phase transition attributes described above encompass more than just the three compounds listed in Table I. In general they are oxides of elements found in Group VB or IVB of the periodic table, and are further characterized by their narrow 3d bands and energy gaps ranging from 0.1 to 0.4 eV. In particular, the group consists of VO, VO$_2$, V$_2$O$_3$, V$_3$O$_5$, V$_4$O$_7$, V$_5$O$_9$, V$_6$O$_{11}$, V$_7$O$_{13}$, V$_8$O$_{15}$, Ti$_2$O$_3$, Ti$_4$O$_7$, NbO$_2$, FeSi$_2$, VO$_2$NbO$_2$, V$_{1-x}$Mo$_x$O$_2$, VO$_2$-TiO$_2$, V$_2$O$_3$-Ti$_2$O$_3$, V$_{1-x}$Ge$_x$O$_2$, V$_{1-x}$Nb$_x$O$_2$, V$_{1-x}$Nb$_x$O$_2$, V$_{1-x}$Cr$_x$O$_2$, $(Cr_xV_{1-x})_2O_3$ and V$_{1-x}$Ti$_x$O$_2$. These compounds are all capable of undergoing a rapid transition between metallic (reflective) and non-metallic (transmissive) states at the behest of externally introduced stimuli.

Figure 4:
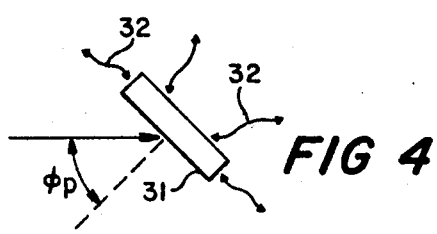
FIG. 4 schematically depicts a device stimulated with thermal energy.
Figure 5:
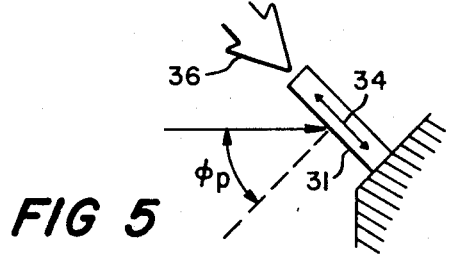
FIG. 5 schematically depicts a device stimulated by hydrostatic pressure created by an externally applied force.

Oxide compounds from the above-described group are amenable to stimulation by means other than electric field. As shown in FIG. 4, translation between states may be induced by the application or withdrawal of thermal energy 32 to modulator device 31. Here, device 31 may have a single crystal or layered structure. Another stimulus is schematically depicted in FIG. 5. The stimulus, hydrostatic pressure 34, is created by the imposition or alteration of an external force 36. Irrespective of whether an electric field, thermal energy or hydrostatic pressure is utilized, the magnitude of the stimulus may be fixed, variable or a combination of both.

A pervasive characteristic making all the oxide compounds in the above defined group particularly appropriate for modulating the polarization of incident luminous energy lies in rapid rate at which transition between states can be induced. With transition between states taking place in microseconds, and at times extending to the nanosecond range, the potential data rate is adequate for digital format transmission with efficient utilization of the available bandwidth.

I claim:

1. A polarizing modulator for altering the polarization of the reflected portion of an unpolarized incident luminous energy beam striking said modulator, comprising:

an optical element having a substantially flat incident surface, and fabricated with a substrate which is substantially transparent at the wavelength of said luminous energy beam and has deposited thereupon a thin film of transition material from the group consisting of VO, VO$_2$, VO$_2$O$_3$, V$_3$O$_5$, V$_4$O$_7$, V$_5$O$_9$, V$_6$O$_{11}$, V$_7$O$_{13}$, V$_8$O$_{15}$, Ti$_2$O$_3$, Ti$_4$O$_7$, NbO$_2$, FeSi$_2$, VO$_2$NbO$_2$, V$_{1-x}$Mo$_x$O$_2$, VO$_2$-TiO$_2$, V$_2$O$_3$-Ti$_2$O$_3$, V$_{1-x}$Ge$_x$O$_2$, V$_{1-x}$Nb$_x$O$_2$, V$_{1-x}$Cr$_x$O$_2$, $(Cr_xV_{1-x})_2O_3$ and V$_{1-x}$Ti$_x$O$_2$;

said flat surface of the optical element oriented at Brewster's angle with respect to said incident unpolarized luminous energy beam, where said Brewster's angle is a constant defined by the material forming the exterior of said flat surface; and a means for stimulating said transitional material between reflective and transmissive states.

2. The modulator recited in claim 1, wherein said stimulating means impresses an electric field across said optical element transitional material, and comprises two sets of substantially transparent juxtaposed electrodes, deposited on or in close proximity to said material, so that said material is located therebetween, connected to a controllable voltage source.

* * * * *